United States Patent [19]

Stoppels et al.

[11] Patent Number: 4,719,148

[45] Date of Patent: * Jan. 12, 1988

[54] MAGNETIC HEAD HAVING A CORE OF MN-ZN-CO FERROUS FERRITE

[75] Inventors: Doeko Stoppels; Leonardus A. H. Van Hoof, both of Eindhoven, Netherlands

[73] Assignee: U.S. Philips Corporation, New York, N.Y.

[*] Notice: The portion of the term of this patent subsequent to Feb. 4, 2003 has been disclaimed.

[21] Appl. No.: 470,832

[22] Filed: Feb. 28, 1983

[30] Foreign Application Priority Data

Dec. 20, 1982 [NL] Netherlands ............ 8204897

[51] Int. Cl.$^4$ .............................. G11B 7/12
[52] U.S. Cl. .................. 428/336; 252/62.56; 252/62.62; 360/125; 428/694; 428/697; 428/702; 428/900
[58] Field of Search ............. 360/127, 110, 125, 126; 428/697, 336, 694, 702, 900; 252/62.62, 62.56

[56] References Cited

U.S. PATENT DOCUMENTS

| | | | |
|---|---|---|---|
| 3,078,234 | 4/1958 | Davis, Jr. | 252/62.56 |
| 3,236,777 | 2/1966 | Im et al. | 252/62.56 |
| 3,252,913 | 5/1966 | Gils et al. | 252/62.56 |
| 3,271,316 | 9/1966 | Inoeu et al. | 252/62.56 |
| 3,375,195 | 3/1968 | Brockman | 252/62.56 |
| 3,428,416 | 2/1969 | Gie et al. | 252/62.56 |
| 3,709,822 | 1/1973 | Ritzen et al. | 252/62.62 |
| 4,069,164 | 1/1978 | Dezawa et al. | 252/62.62 |
| 4,096,080 | 6/1978 | Mollard et al. | 252/62.56 |
| 4,179,387 | 12/1979 | Sasazawa et al. | 252/62.62 |
| 4,297,395 | 10/1981 | Buxbaum et al. | 252/62.62 |
| 4,331,548 | 5/1982 | Yorizumi et al. | 360/127 |
| 4,439,794 | 3/1984 | Shiroishi et al. | 252/62.59 |
| 4,568,993 | 2/1986 | Stoppels et al. | 428/694 |

Primary Examiner—George F. Lesmes
Assistant Examiner—William M. Atkinson
Attorney, Agent, or Firm—Marc D. Schechter

[57] ABSTRACT

A magnetic head for a magnetic recording and playback device. The head comprises a Mn-Zn-ferrous ferrite core having a very high saturation magnetization and magnetic permeability. The Mn-Zn-ferrous-ferrite has a composition according to the formula $$Mn_aZn_bFe_c^{II}Co_xFe_2^{III}O_4$$

with
$0 < a \leq 0.55$
$0.06 \leq b \leq 0.4$
$0.34 \leq c \leq 0.9$
$0.0006 \leq x \leq 0.006$.

7 Claims, 5 Drawing Figures

MAGNETIC HEAD HAVING A CORE OF MN-ZN-CO FERROUS FERRITE

BACKGROUND OF THE INVENTION

The invention relates to a magnetic head for use in a magnetic recording and playback device. The head has Mn-Zn ferrite core having two core portions. A transducing gap is formed between the two core portions.

It is known to use ferrites, particularly by monocrystalline Mn-Zn ferrites, as magnetic core materials for magnetic heads for use in magnetic tape recording and playback devices, such as for example audio and video tape recorders. This is evident since ferrites have the advantages of high resistance to detrition and very good magnetic properties. For example, ferrites have desirable values of magnetic saturation, coercive force and permeability, and they have good frequency characteristics.

DESCRIPTION OF THE PRIOR ART

Magnetic fields which are generated at the area of the transducing gap by a magnetic head to write information on a magnetic medium depend directly on the saturation magnetization of the material of the core of the magnetic head. Magnetic heads used in present-day video recorders usually have a core of Mn-Zn ferrite. This type of material has a saturation magnetization $M_s$ of approximately 500 mT at room temperature. The magnetization satisfies various requirements which are imposed upon the writing of information on conventional tapes (for example $CrO_2$ tape with a coercive force $H_c$ of approximately 50 kA/m (630 Oe)), including use at temperatures which are slightly above room temperature.

However, in order to improve the quality of the video recording process, there exists a tendency to replace the conventional magnetic tapes with magnetic tapes having a higher coercive force. Tapes made of pure Fe may have a coercive force of approximately 90–140 kA/m. The use of such magnetic tapes magnetic core materials having larger saturation magnetizations than the present-day ferrite materials. The material, in order to be suitable for use in reading operations, must also have a sufficiently high magnetic permeability at the operating temperature of the magnetic head.

SUMMARY OF THE INVENTION

It is an object of the present invention to provide a core for a magnetic head which consists of a ferrite which has a saturation magnetization which is maximized at a level higher than 500 mT while maintaining a sufficiently high magnetic permeability at the operating temperature of the magnetic head.

This object is achieved in that the magnetic head according to the invention has a core of manganese-zinc-ferro-ferrite of the composition (not counting substitutions) $Mn_aZn_bFe_c^{II}Fe_2^{III}O_4$ with $0<a\leq 0.55$, $0.06\leq b\leq 0.4$ and $0.34\leq c\leq 0.9$ and with a $Co^{II}$ substitution which shifts the maximum value of the magnetic permeability as much as possible into the range of the operating temperature of the magnetic head. It has been found that non-Co-substituted Mn-Zn-ferrous ferrite having such a composition with a considerably higher ferrous content than the Mn-Zn-ferrous ferrites used heretofore for video heads (where c is between 0.04 and 0.08), has a high value of saturation magnetization increasing with the ferrous content. The highest value found in this range of compositions at room temperature (20° C.) is approximately 690 mT. Thus, the value of 500 mT for the presently used Mn-Zn-ferrous ferrite is improved by some 38%. Recording on magnetic tapes with a coercive force up to 120 to 130 kA/m is thus achievable with magnetic heads having magnet cores of this material.

The highest value of the magnetic permeability in the temperature range from 20°–40° C. (the operating temperature of a video magnetic head), however, in this range of compositions is found with a ferrous content of approximately 11 at.%. With that $Fe^{II}$ content a (suboptimum) saturation magnetization value of 640 mT is achieved. According to the invention, it is possible with any $Fe^{II}$-content necessary to realize a desired high $M_s$ value, to shift the maximum of the permeability into the operating temperature range by adding a small quantity of $Co^{II}$, depending on the $Fe^{II}$ content. The content of $Co^{II}$ which is necessary varies from 0.02 to 0.2 at.%, calculated with reference to the overall number of metal ions.

The resistivity of for example a monocrystalline material of the above-mentioned composition is $4\times 10^{-2} \Omega cm$. Although the electric conductivity of this material appears to be too large for use in high frequency magnetic heads (as a result of the Skin-effect), it has instead been found, that with the present-day dimensions of video heads, this comparatively high conductivity causes no problems when handling signals of a frequency up to even 4.5 MHz (video frequency) when the head cores are not thicker than 200 μm.

For the core of the magnetic head according to the invention, a single crystal ferrite is preferably used. Single crystals of this material can be grown comparatively easily by means of the so-called "seeded" Bridgman technique. This is a modified Bridgman technique in which a seed crystal is used.

DESCRIPTION OF THE PREFERRED EMBODIMENTS

Figure 1:
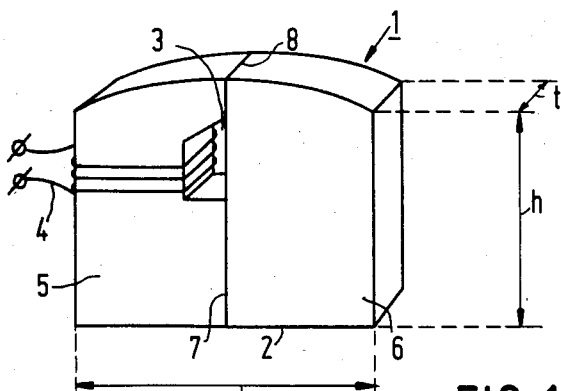
FIG. 1 is a partly schematic perspective view of a magnetic head.

FIG. 1 shows a magnetic head 1 having a magnet core 2. The magnet core 2 has a winding aperture 3 through which a winding 4 is wound. The magnet core is formed from two single crystal wafers 5 and 6 made of a Mn-Zn-ferrous-ferrite. The wafers are bonded together at the joints 7 and 8 by means of glass.

Figure 2:
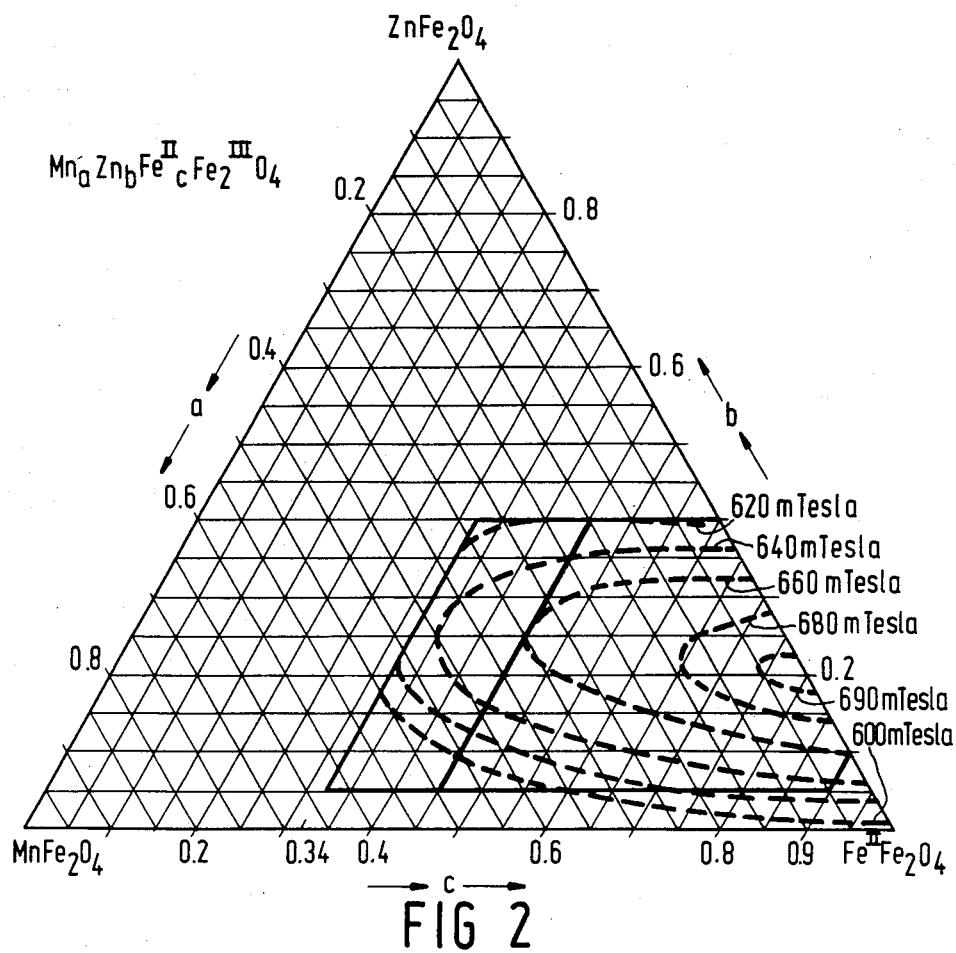
FIG. 2 is a ternary composition diagram of Mn-Zn ferrous-ferrite indicating the range of compositions to which the present invention relates and the measured $M_s$ values at 20° C.

The saturation magnetization $M_s$ in $Mn_aZn_bFe_c^{II}Fe_2^{III}O_4$ magnet cores with $0<a\leq 0.55$, $0.06\leq b\leq 0.4$ and $0.34\leq c\leq 0.9$ increases with the ferrous content from approximately 600 mTesla to approximately 690 mTesla. This is illustrated in FIG. 2. All $M_s$ values were measured by means of a vibrating sample magnetometer.

The highest permeability value in the temperature range from 20° to 40° C. which was found corresponds to a (suboptimum) saturation magnetization value of 640 mT. However, a magnetic head having a core of a material having a saturation magnetization of 640 mT is just barely capable of writing on a pure iron tape ("metal tape"). It is therefore desirable to increase the saturation magnetization while maintaining the maximum value of the magnetic permeability in the temperature range from 20° to 40° C. (the operating temperature range of a video head). However, when the ferrous content of the core is increased so as to increase the saturation magnetization (see FIG. 2), the maximum permeability is shifted to temperatures beyond the operating temperature ranges.

It has now been found that maximum magnetic permeability can be maintained in the operating temperature range, when the ferrous content is increased so as to increase the saturation magnetization, by substituting a small quantity of $Co^{II}$ in the ferrite. This will be explained with reference to FIGS. 3 and 4.

Figure 3:
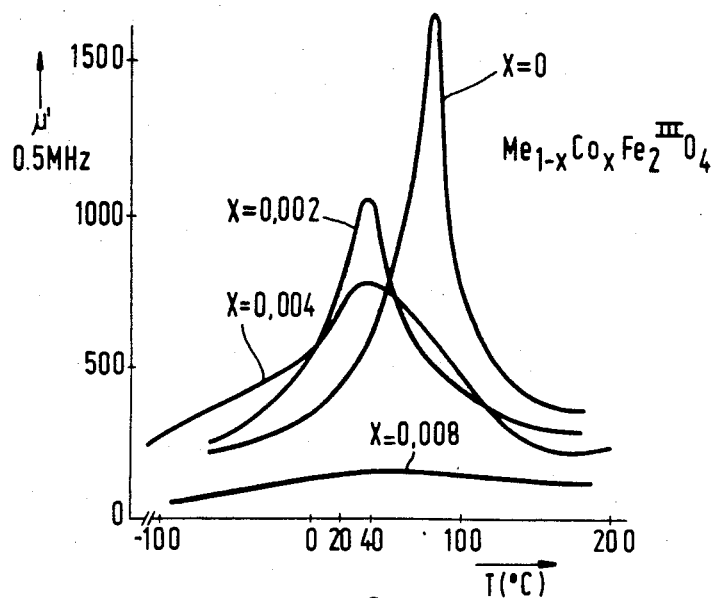
FIGS. 3 and 4 are graphs showing the real component of the magnetic permeability $\mu'$ of annular cores of $Me_{1-x}Co_x^{II}Fe_2^{III}O_4$ (with Me=(Mn, Zn, and $Fe^{II}$)) with different quantities of $Co^{II}$ as a function of the temperature T in °C.
Figure 4:
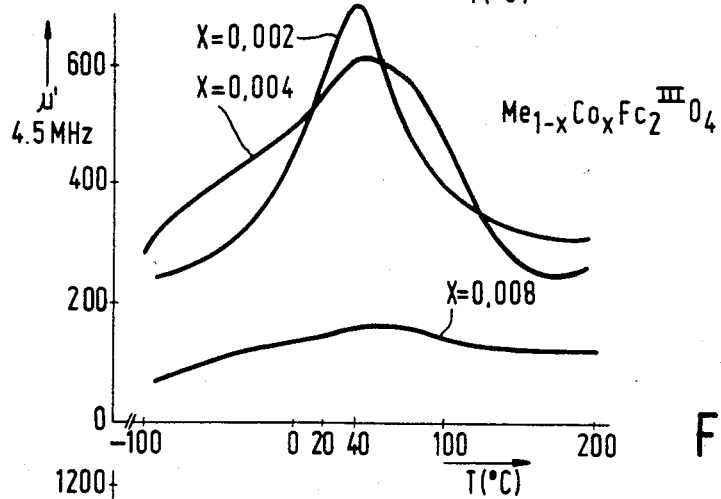

FIGS. 3 and 4 show the real part of the magnetic permeability $\mu'$ of monocrystalline annular cores of Mn-Zn-ferrous ferrite with different Co-contents, measured at 0.5 MHz and 4.5 MHz, respectively. The $Co^{II}$ content is indicated by the variable x. The composition of the annular core material is given by the formula $Me_{1-x}Co_xFe_2{}^{III}O_4$, where Me=(Mn, Zn, and $Fe^{II}$).

In the compositions chosen in the examples of FIGS. 3 and 4, the maximum permeability, in the case in which no Co is substituted (x=0) is clearly outside the temperature range of approximately 20° C. to approximately 40° C. which is the range of interest for video head applications.

The addition of a small quantiy of $Co^{II}$ (x=0.002, and x=0.004, respectively) shifts the maximum substantially into the temperature range from 20° to 40° C., when the $Fe^{II}$ content is increased, both at 0.5 MHz (FIG. 3) and at 4.5 MHz (FIG. 4). Thus the value of $\mu'$ remains high enough for video applications, while the $Fe^{II}$ content and hence $M_s$ can be increased.

It also follows from FIGS. 3 and 4 that the quantity of Co added must be limited. In the case of x=0.008, for example, the permeability in the temperature range from 20° to 40° C. is too low for use in high frequency magnetic heads since maximization has disappeared as a result of overcompensation of the magnetic anisotropy and stabilization of domain walls.

An example of a suitable $Me_{1-x}Co_xFe_2{}^{III}O_4$ material is:

$Mn_{0.36}Zn_{0.25}Co_{0.002}Fe_{0.39}{}^{II}Fe_2{}^{III}O_4$

This material comprises 0.07 at.% $Co^{II}$ and 13 at.% $Fe^{II}$ and exhibits a $\mu'$ (T) maximum of 700 at 4.5 MHz at 40° C. The saturation magnetization is 654 mT.

Another example of a $Me_{1-x}Co_xFe_2{}^{III}O_4$ material is:

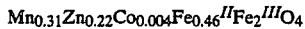

$Mn_{0.31}Zn_{0.22}Co_{0.004}Fe_{0.46}{}^{II}Fe_2{}^{III}O_4$

This material comprises 0.13 at.% $Co^{II}$ and 15.3 at.% $Fe^{II}$. At 40° C., it exhibits a $\mu'$ (T) maximum of 600 at 4.5 MHz. The saturation magnetization is 660 mT.

Briefly summarized, the invention results from the fact that the addition of a small quantity of $Co^{II}$ to Mn-Zn-ferrous ferrite enables one to use a higher $Fe^{II}$ concentration, in particular an $Fe^{II}$ concentration higher than 11 at.%. A higher $Fe^{II}$ concentration produces a higher $M_s$. For the value of the $\mu'$ (T) maximum, it is only necessary that the permeability not be too small. A lower limit is, for example, 400–500 at 4.5 MHz.

It will be apparent from the above that (monocrystalline) Co-substituted Mn-Zn-ferrous-ferrite with increased ferrous content is a very suitable material for magnetic read/write heads which are used in combination with highly coercive magnetic tapes, such as metal powder tape or vapor-deposited metal tape. When used in combination with iron oxide magnetic tapes having a lower coercive force, the intermodulation distortion and the signal strength thereby is improved.

Characteristic dimensions for the magnetic head 1 of FIG. 1 are L=3 mm and h=3 mm. With a thickness t of 200 $\mu$m or less, it was possible to operate a magnetic head of monocrystalline Mn-Zn-ferrous-ferrite with increased ferrous content at frequencies of a few MHz without being troubled by the Skin-effect in spite of a comparatively low resistivity. The resistivity of a monocrystalline sample of $Mn_{0.37}Zn_{0.27}Fe_{0.36}{}^{II}Fe_2{}^{III}O_4$ measured by means of the four-point method is, for example $4 \times 10^{-2} \Omega cm$ at 20° C.

Single crystals of Co-substituted Mn-Zn-ferrous-ferrite with an increased ferrous content could be grown at a temperature of 1625° C. by means of the "seeded" Bridgman technique in a platinum crucible in an oxygen atmosphere. The direction of growth was [100], and the growth rate was approximately 4 mm/h. During cooling, nitrogen was added. The quantity of nitrogen added was increased as the temperature decreased.

Single crystals were obtained having a length of 5 cm and a diameter of 2 cm.

Figure 5:
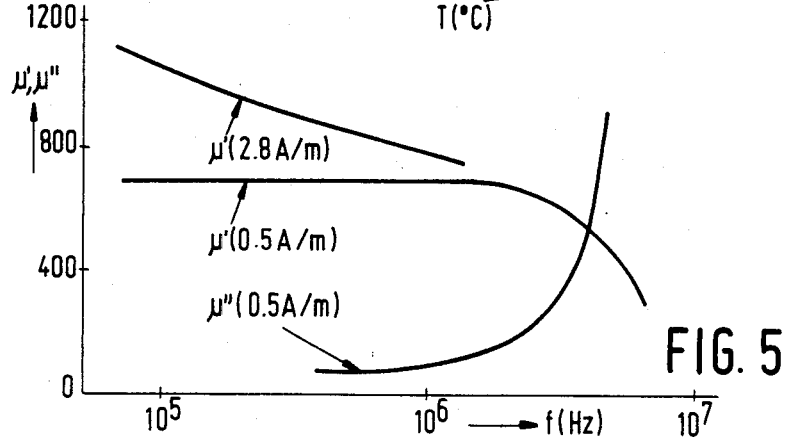
FIG. 5 is a graph showing the components of the magnetic permeability $\mu'$ and $\mu''$ of an annular core of $Mn_{0.31}Zn_{0.22}Co_{0.004}Fe_{0.46}^{II}Fe_2^{III}O_4$ as a function of the frequency at 40° C.

FIG. 5 graphically shows, the frequency dependence of the real and the imaginary components ($\mu'$ and $\mu''$, respectively) of the magnetic permeability at 40° C., the temperature at which the magnetic permeability $\mu'$ (T) of a ferrite of this composition approximately reaches it maximum. The measurements were made on an annular core having a thickness of 180 $\mu$m and having the composition

$Mn_{0.31}Zn_{0.22}Co_{0.004}Fe_{0.46}{}^{II}Fe_2{}^{III}O_4$.

The core was monocrystalline.

Other aspects of the invention will be apparent to the skilled artisan, the scope thereof being defined by the appended claims. 9n

What is claimed is:

1. A magnetic head for a magnetic recording and playback device, said magnetic head comprising a magnetic core of two core portions with a transducing gap therebetween, characterized in that:

the core is formed of a material having the composition

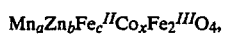

$Mn_aZn_bFe_c{}^{II}Co_xFe_2{}^{III}O_4$, where
$0 < a \leq 0.55$;
$0.06 \leq b \leq 0.4$;
$0.34 \leq c < 0.9$;
x is chosen to shift the maximum magnetic permeability of the core as close as possible to an operating temperature range of the magnetic head;
$a+b+c+x=1$; and the core has a thickness not greater than 200 microns.

2. A magnetic head as claimed in claim 1, characterized in that the core is a single crystal ferrite.

3. A magnetic head as claimed in claim 1, characterized in that $0.45 \leq c \leq 0.9$.

4. A magnetic head as claimed in claim 1, characterized in that $0.0006 \leq x \leq 0.006$.

5. A magnetic head as claimed in claim 4, characterized in that the core is a single crystal ferrite.

6. A magnetic head as claimed in claim 4, characterized in that $0.45 \leq c \leq 0.9$.

7. A magnetic head as claimed in claim 6, characterized in that the core is a single crystal ferrite.

* * * * *